United States Patent
Liu et al.

(10) Patent No.: US 10,904,896 B2
(45) Date of Patent: Jan. 26, 2021

(54) SOUNDING REFERENCE SIGNAL TRANSMISSION METHOD AND APPARATUS, AND SYSTEM

(71) Applicant: Huawei Technologies Co., Ltd., Shenzhen (CN)

(72) Inventors: Zhe Liu, Shanghai (CN); Dongdong Wei, Shanghai (CN); Jialing Liu, Chicago, IL (US); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/549,923

(22) Filed: Aug. 23, 2019

(65) Prior Publication Data

US 2019/0380134 A1 Dec. 12, 2019

Related U.S. Application Data

(63) Continuation of application No. PCT/CN2018/100106, filed on Aug. 10, 2018.

(30) Foreign Application Priority Data

Aug. 11, 2017 (CN) .......................... 2017 1 0687907

(51) Int. Cl.
*H04W 72/10* (2009.01)
*H04L 5/00* (2006.01)
(Continued)

(52) U.S. Cl.
CPC ........... *H04W 72/10* (2013.01); *H04L 5/0048* (2013.01); *H04W 24/08* (2013.01);
(Continued)

(58) Field of Classification Search
None
See application file for complete search history.

(56) References Cited

U.S. PATENT DOCUMENTS

| 2013/0078913 A1 | 3/2013 | Lee et al. |
| 2013/0223397 A1 | 8/2013 | Kim et al. |

(Continued)

FOREIGN PATENT DOCUMENTS

| CN | 102934382 A | 2/2013 |
| CN | 104137465 A | 11/2014 |

(Continued)

OTHER PUBLICATIONS

"SRS Collisions due to Carrier Switching," 3GPP TSG RAN WG1 #86bis, Lisbon, Portugal, R1-1609031, pp. 1-2, 3rd Generation Partnership, Project, Valbonne, France (Oct. 10-14, 2016).

(Continued)

*Primary Examiner* — Anh Vu H Ly
(74) *Attorney, Agent, or Firm* — Leydig, Voit & Mayer, Ltd.

(57) ABSTRACT

Embodiments of this application provide a sounding reference signal (SRS) transmission method, apparatus, and system, so as to implement sounding reference signal BP-based switching. The method includes: determining that a transmission conflict occurs between a sounding reference signal (SRS) on a first bandwidth part (BP) and an SRS on a second BP; and discarding the SRS on the first BP, where a priority of the SRS on the first BP is lower than a priority of the SRS on the second BP.

20 Claims, 7 Drawing Sheets

(51) Int. Cl.
  *H04W 24/08* (2009.01)
  *H04W 28/02* (2009.01)
  *H04W 72/04* (2009.01)
  *H04W 72/12* (2009.01)

(52) U.S. Cl.
  CPC ... *H04W 28/0284* (2013.01); *H04W 72/0446* (2013.01); *H04W 72/0453* (2013.01); *H04W 72/1289* (2013.01)

(56) References Cited

U.S. PATENT DOCUMENTS

| | | | |
|---|---|---|---|
| 2013/0242895 A1 | 9/2013 | Chen et al. | |
| 2015/0365831 A1 | 12/2015 | Ko et al. | |
| 2015/0372792 A1 | 12/2015 | Damnjanovic et al. | |
| 2017/0347322 A1 | 11/2017 | Lee et al. | |
| 2018/0323928 A1* | 11/2018 | Yang | H04L 5/0048 |
| 2019/0006031 A1 | 1/2019 | Hyde et al. | |
| 2019/0053103 A1* | 2/2019 | Manolakos | H04W 28/20 |
| 2019/0281588 A1* | 9/2019 | Zhang | H04W 52/08 |
| 2020/0136878 A1* | 4/2020 | Yi | H04W 24/10 |
| 2020/0154319 A1* | 5/2020 | Manolakos | H04L 5/0042 |
| 2020/0177342 A1* | 6/2020 | Pawar | H04L 5/0051 |
| 2020/0244489 A1* | 7/2020 | Rahman | H04L 5/0051 |
| 2020/0252180 A1* | 8/2020 | Takeda | H04W 72/042 |

FOREIGN PATENT DOCUMENTS

| | | |
|---|---|---|
| CN | 104780032 A | 7/2015 |
| CN | 105210403 A | 12/2015 |
| CN | 105812088 A | 7/2016 |

OTHER PUBLICATIONS

"Details on collision handling for SRS switching," 3GPP TSG RAN WG1 Meeting #86bis, Lisbon, Portugal, R1-1608589, pp. 1-3, 3rd Generation Partnership, Project, Valbonne, France (Oct. 10-14, 2016).

"Handling of multiple SR configurations," 3GPP TSG RAN WG2 Meeting NR Ad hoc, Qingdao, China, R2-1707024, XP051301520, pp. 1-4, 3rd Generation Partnership Project, Valbonne, France (Jun. 27-29, 2017).

* cited by examiner

SOUNDING REFERENCE SIGNAL TRANSMISSION METHOD AND APPARATUS, AND SYSTEM

CROSS-REFERENCE TO RELATED APPLICATIONS

This application is a continuation of International Application No. PCT/CN2018/100106, filed on Aug. 10, 2018, which claims priority to Chinese Patent Application No. 201710687907.3, filed on Aug. 11, 2017. The disclosures of the aforementioned applications are hereby incorporated by reference in their entireties.

TECHNICAL FIELD

This application relates to the field of communications technologies, and in particular, to a sounding reference signal (SRS) transmission method and apparatus, and a system.

BACKGROUND

An SRS is introduced into a long term evolution (LTE) system so as to perform uplink channel measurement. In addition, in a time division duplex (TDD) scenario, with uplink and downlink channel reciprocity, accurate downlink transmission may be further performed based on uplink channel information measured by using the SRS.

In the prior art, LTE-Release 13 supports carrier aggregation (CA) of a maximum of 32 component carriers (CCs). In addition, limited by a capability of a terminal, a quantity of configured uplink CCs usually cannot be greater than a quantity of configured downlink CCs. Therefore, when a TDD CC is configured, if some TDD CCs are used only for downlink transmission, the terminal cannot transmit the SRS on these TDD CCs, and accurate downlink transmission cannot be performed based on uplink channel information measured by using the SRS. To resolve this problem, SRS carrier-based switching is introduced into LTE-Release 14. To be specific, an SRS may be switched from one CC to another CC for transmission, so that uplink channel information of the another CC can be measured. A CC before switching is denoted as switching from CC, and a CC after switching is denoted as switching to CC. The switching from CC is a carrier that may be used for transmission of at least one of a physical uplink shared channel (PUSCH), a physical uplink control channel (PUCCH), a physical random access channel (PRACH), or an SRS in uplink, and the switching to CC is a TDD carrier that is used for transmission of only an SRS and/or a PRACH in uplink.

Similarly, in a broadband CC supported by new radio (NR), the broadband CC may be divided into a plurality of bandwidth parts (BPs or BWPs, which is represented by BP in the following). A BP that may be used for transmission of a PUSCH, a PUCCH, a PRACH, an SRS, or the like in uplink is referred to as an uplink (UL) BP. A bandwidth part (BP or BWP, which is represented by BP in the following) that is used for transmission of only an SRS and/or a PRACH in uplink is referred to as an SRS BP. In addition, during NR design, a radio frequency (RF) capability of the terminal is decoupled from system bandwidth, and the RF capability of the terminal is decoupled from operating bandwidth of the terminal. Therefore, there may be a plurality of SRS BPs. To measure uplink channel information of the SRS BP, the terminal may be switched from an uplink BP activated by the terminal to an SRS BP. In this case, currently there is no related solution as for how to perform SRS BP-based switching.

SUMMARY

Embodiments of this application provide an SRS transmission method, a device, and a system, so as to implement SRS BP-based switching.

To achieve the foregoing objective, the embodiments of this application provide the following technical solutions.

According to a first aspect, a sounding reference signal SRS transmission method is provided. The method includes: determining that a transmission conflict occurs between an SRS on a first bandwidth part BP and an SRS on a second BP; and discarding the SRS on the first BP, where a priority of the SRS on the first BP is lower than a priority of the SRS on the second BP. Based on the solution, an SRS with a lower priority may be discarded when a transmission conflict occurs between SRSs on two BPs. To be specific, a terminal may be switched from an active uplink BP to a BP on which an SRS with a higher priority is transmitted, to transmit an SRS on the BP on which the SRS with a higher priority is transmitted. Therefore, SRS BP-based switching can be implemented.

Optionally, the first BP is an uplink BP activated by the terminal, and the second BP is an SRS BP of the terminal; or both the first BP and the second BP are SRS BPs of the terminal. If the first BP is the uplink BP activated by the terminal, and the second BP is the SRS BP of the terminal, the terminal may be switched from the first BP to the second BP to transmit an SRS on the second BP. If both the first BP and the second BP are SRS BPs of the terminal, the terminal may be switched from the active uplink BP to the second BP to transmit an SRS on the second BP.

Optionally, the priority of the SRS on the first BP and the priority of the SRS on the second BP are related to a location of a radio frequency RF of the terminal.

For example, in a possible design, that a priority of the SRS on the first BP is lower than a priority of the SRS on the second BP includes the following: The first BP is an SRS BP in the RF of the terminal, and the second BP is an SRS BP out of the RF of the terminal. To be specific, in consideration that the uplink BP activated by the terminal is in the RF of the terminal, RF retuning does not need to be performed when the terminal is switched from the active uplink BP to the first BP, and RF retuning needs to be performed when the terminal is switched from the active uplink BP to the second BP. However, generally, on an SRS BP on which RF retuning does not need to be performed, a configuration density of the SRS is relatively high; and on an SRS BP on which RF retuning needs to be performed, a configuration density of the SRS is relatively low. Therefore, to obtain a channel status of entire carrier bandwidth as soon as possible, the SRS BP in the RF of the terminal may be discarded when a transmission conflict occurs between the SRS on the SRS BP out of the RF of the terminal and the SRS on the SRS BP in the RF of the terminal.

Alternatively, for example, in a possible design, that a priority of the SRS on the first BP is lower than a priority of the SRS on the second BP includes the following: Both the first BP and the second BP are SRS BPs in the RF of the terminal, and a transmission cycle of the SRS on the first BP is shorter than a transmission cycle of the SRS on the second BP, and both the SRS on the first BP and the SRS on the second BP are periodic SRSs, or both the SRS on the first BP and the SRS on the second BP are semi-persistent scheduling SRSs. To be specific, for a same type of SRSs on BPs whose locations relative to the RF of the terminal are the same, in consideration that an SRS with a relatively short transmission cycle has a higher appearance probability than an SRS with a relatively long transmission cycle, the SRS with a relatively short transmission cycle may be discarded when a transmission conflict occurs between the SRS with a relatively short transmission cycle and the SRS with a relatively long transmission cycle, and the SRS is retransmitted in a next transmission cycle.

Alternatively, for example, in a possible design, that a priority of the SRS on the first BP is lower than a priority of the SRS on the second BP includes the following: Both the first BP and the second BP are SRS BPs out of the RF of the terminal, a transmission cycle of the SRS on the first BP is shorter than a transmission cycle of the SRS on the second BP, and both the SRS on the first BP and the SRS on the second BP are periodic SRSs, or both the SRS on the first BP and the SRS on the second BP are semi-persistent scheduling SRSs. To be specific, for a same type of SRSs on BPs whose locations relative to the RF of the terminal are the same, in consideration that an SRS with a relatively short transmission cycle has a higher appearance probability than an SRS with a relatively long transmission cycle, the SRS with a relatively short transmission cycle may be discarded when a transmission conflict occurs between the SRS with a relatively short transmission cycle and the SRS with a relatively long transmission cycle, and the SRS is retransmitted in a next transmission cycle.

Alternatively, for example, in a possible design, that a priority of the SRS on the first BP is lower than a priority of the SRS on the second BP includes the following: Both the first BP and the second BP are SRS BPs in the RF of the terminal, the SRS on the first BP is a periodic SRS, and the SRS on the second BP is a semi-persistent scheduling SRS; or the SRS on the first BP is a periodic SRS, and the SRS on the second BP is an aperiodic SRS; or the SRS on the first BP is a semi-persistent scheduling SRS, and the SRS on the second BP is an aperiodic SRS. To be specific, for different types of SRSs, in consideration that the aperiodic SRS appears irregularly, the semi-persistent scheduling SRS appears regularly but depends on whether DCI triggers or terminates sending of the SRS, and the periodic SRS appears regularly without depending on an external condition, the periodic SRS may be discarded when a transmission conflict occurs between the periodic SRS and the semi-persistent scheduling SRS, and the SRS is retransmitted next time; and the semi-persistent scheduling SRS may be discarded when a transmission conflict occurs between the aperiodic SRS and the semi-persistent scheduling SRS, and the SRS is retransmitted next time. That is, a priority of the aperiodic SRS>a priority of the semi-persistent scheduling SRS>a priority of the periodic SRS.

Alternatively, for example, in a possible design, that a priority of the SRS on the first BP is lower than a priority of the SRS on the second BP includes the following: Both the first BP and the second BP are SRS BPs out of the RF of the terminal, the SRS on the first BP is a periodic SRS, and the SRS on the second BP is a semi-persistent scheduling SRS; or the SRS on the first BP is a periodic SRS, and the SRS on the second BP is an aperiodic SRS; or the SRS on the first BP is a semi-persistent scheduling SRS, and the SRS on the second BP is an aperiodic SRS. To be specific, for different types of SRSs, in consideration that the aperiodic SRS appears irregularly, the semi-persistent scheduling SRS appears regularly but depends on whether DCI triggers or terminates sending of the SRS, and the periodic SRS appears regularly without depending on an external condition, the periodic SRS may be discarded when a transmission conflict occurs between the periodic SRS and the semi-persistent scheduling SRS, and the SRS is retransmitted next time; and the semi-persistent scheduling SRS may be discarded when a transmission conflict occurs between the aperiodic SRS and the semi-persistent scheduling SRS, and the SRS is retransmitted next time. That is, a priority of the aperiodic SRS>a priority of the semi-persistent scheduling SRS>a priority of the periodic SRS.

Optionally, that a priority of the SRS on the first BP is lower than a priority of the SRS on the second BP includes the following: A transmission cycle of the SRS on the first BP is shorter than a transmission cycle of the SRS on the second BP, both the SRS on the first BP and the SRS on the second BP are periodic SRSs, or both the SRS on the first BP and the SRS on the second BP are semi-persistent scheduling SRSs. To be specific, for a same type of SRSs, in consideration that an SRS with a relatively short transmission cycle has a higher appearance probability than an SRS with a relatively long transmission cycle, the SRS with a relatively short transmission cycle may be discarded when a transmission conflict occurs between the SRS with a relatively short transmission cycle and the SRS with a relatively long transmission cycle, and the SRS is retransmitted in a next transmission cycle.

Optionally, the first BP and the second BP are BPs on a same broadband component carrier CC.

Optionally, the method further includes: receiving configuration information of an SRS, where the configuration information of the SRS includes configuration information of the SRS on the first BP and configuration information of the SRS on the second BP, the configuration information of the SRS on the first BP includes a first time domain resource used for transmission of the SRS on the first BP, and the configuration information of the SRS on the second BP includes a second time domain resource used for transmission of the SRS on the second BP; and the determining that a transmission conflict occurs between an SRS on a first BP and an SRS on a second BP includes: determining, based on the first time domain resource, the second time domain resource, and an RF retuning time, that a transmission conflict occurs between the SRS on the first BP and the SRS on the second BP. In this manner, it may be determined that a transmission conflict occurs between the SRS on the first BP and the SRS on the second BP.

In a possible design, the determining, based on the first time domain resource, the second time domain resource, and an RF retuning time, that a transmission conflict occurs between the SRS on the first BP and the SRS on the second BP includes: determining, based on the first time domain resource, the second time domain resource, a first RF retuning time, and a second RF retuning time, that a time domain resource required when the terminal is switched from an uplink BP activated by the terminal to the first BP and a time domain resource required when the terminal is switched from the uplink BP activated by the terminal to the second BP overlap, where the first RF retuning time is a time required when the terminal is switched from the uplink BP activated by the terminal to the first BP, the second RF retuning time is a time required when the terminal is switched from the uplink BP activated by the terminal to the second BP, and both the first BP and the second BP are the SRS BPs of the terminal. In this manner, it may be determined that a transmission conflict occurs between the SRS on the first BP and the SRS on the second BP.

In a possible design, the determining, based on the first time domain resource, the second time domain resource, and an RF retuning time, that a transmission conflict occurs between the SRS on the first BP and the SRS on the second BP includes: determining, based on the first time domain resource, the second time domain resource, and a third RF retuning time, that a time domain resource required when the terminal is switched from the first BP to the second BP includes the second time domain resource, where the third RF retuning time is a time required when the terminal is switched from the first BP to the second BP, the first BP is the uplink BP activated by the terminal, and the second BP is the SRS BP of the terminal. In this manner, it may be determined that a transmission conflict occurs between the SRS on the first BP and the SRS on the second BP.

According to a second aspect, a communications apparatus is provided, where the SRS transmission apparatus has a function of implementing the method according to the first aspect. The function may be implemented by hardware, or may be implemented by hardware by executing corresponding software. The hardware or software includes one or more modules corresponding to the function.

According to a third aspect, a communications apparatus is provided, including a processor and a memory. The memory is configured to store a computer executable instruction. The processor is connected to the memory. When the SRS transmission apparatus runs, the processor executes the computer executable instruction stored in the memory, so that the SRS transmission apparatus performs any SRS transmission method according to the first aspect.

Optionally, the communications apparatus in the second aspect and the third aspect may be a chip or may be a terminal.

According to a fourth aspect, a computer-readable storage medium is provided. The computer-readable storage medium stores an instruction, and when the instruction runs on a computer, the computer may perform any sounding reference signal SRS transmission method according to the first aspect.

According to a fifth aspect, a computer program product including an instruction is provided. When the computer program product runs on a computer, the computer may be enabled to perform any sounding reference signal SRS transmission method according to the first aspect.

According to a sixth aspect, a chip system is provided. The chip system includes a processor, and the processor is configured to support a sounding reference signal SRS transmission apparatus in implementing the processing function in the foregoing aspect, for example, determining that a transmission conflict occurs between a sounding reference signal SRS on a first bandwidth part BP and an SRS on a second BP. In a possible design, the chip system may further include a memory, and the memory is configured to store a program instruction and data that are necessary for the SRS transmission apparatus. The chip system may include a chip, or may include a chip and another discrete device.

According to a seventh aspect, a communications system is provided, including a base station and the terminal in the foregoing aspect.

For technical effects brought by any design manner of the second to the sixth aspects, refer to technical effects brought by different design manners of the first aspect, and details are not described herein again.

DESCRIPTION OF EMBODIMENTS

Figure 1:
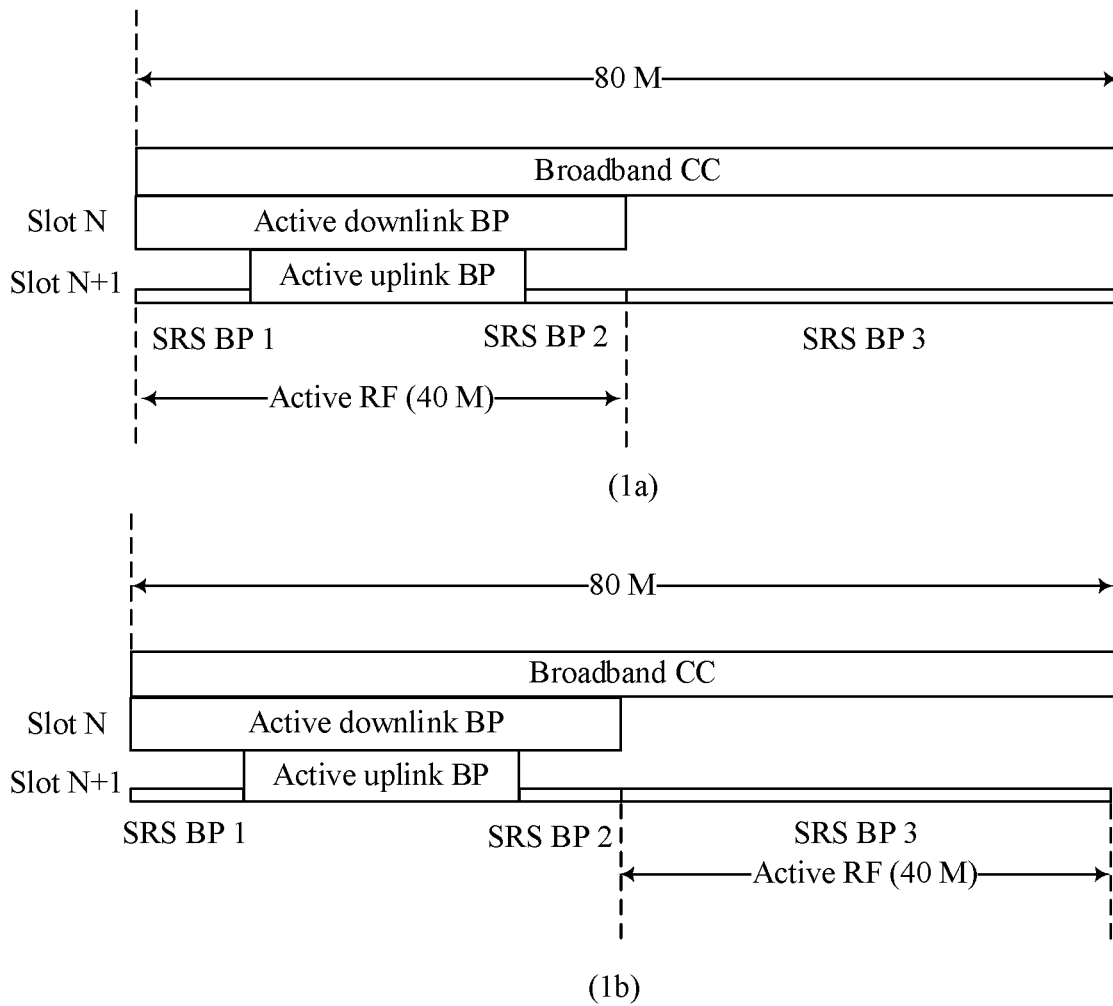
FIG. 1 is a schematic diagram 1 of a BP on a broadband CC according to an embodiment of this application.

For ease of understanding of the technical solutions in the embodiments of this application, the technologies related to this application are first briefly described as follows:

TDD: In a TDD mode, receiving and transmitting in a system are performed in different slots of a same frequency channel, namely, a same carrier, and receiving and transmitting of a channel are separated by a guard time.

Frequency division duplex (FDD): In an FDD mode, receiving and transmitting in a system are performed on two separated symmetric frequency channels, and receiving and transmitting of a channel are separated by a guard band.

Periodic SRS (P-SRS): Radio resource control (RRC) signaling is used to configure time domain resources, frequency domain resources, code domain resources, and comb resources that are used for SRS transmission. The time domain resources include an SRS cycle, an SRS sending slot, and an orthogonal frequency division multiplexing (OFDM) symbol that is used to send the SRS. The SRS is sent once every other SRS cycle according to the configured SRS cycle.

Aperiodic SRS (A-SRS): RRC signaling is used to configure time domain resources, frequency domain resources, code domain resources, and comb resources that are used for SRS transmission. The time domain resources used for the SRS transmission are not fixed, and a terminal is triggered by using downlink control information (DCI) to send the SRS aperiodically.

Semi-persistent scheduling SRS (SPS-SRS): RRC signaling is used to configure time domain resources, frequency domain resources, code domain resources, and comb resources that are used for SRS transmission. The time domain resources include an SRS cycle, an SRS sending slot, and an OFDM symbol that is used to send the SRS. A terminal is triggered by using DCI to send the SRS once every other SRS cycle according to the configured SRS cycle. In addition, the DCI may further trigger the terminal to terminate sending of the SRS.

Carrier: The carrier in the embodiments of this application includes a carrier in a non-CA scenario and a CC in a CA scenario. The CC in the CA scenario may be a primary CC or a secondary CC, and a serving cell in the CA scenario may be a primary serving cell (PCell) or a secondary serving cell (Scell). For ease of description, in some scenarios of the embodiments of this application, the carrier in the non-CA scenario and the CC in the CA scenario may be collectively referred to as carriers. This is not specifically limited in the embodiments of this application. In addition, a part of a carrier or a serving cell that is used for uplink transmission may be understood as an uplink resource or an uplink carrier, and a part of the carrier or the serving cell that is used for downlink transmission may be understood as a downlink resource or a downlink carrier. For example, in an FDD system, a frequency domain resource on a carrier that is used for uplink transmission may be understood as an uplink resource or an uplink carrier, and a frequency domain resource on the carrier that is used for downlink transmission may be understood as a downlink resource or a downlink carrier. Alternatively, for example, in a TDD system, a time domain resource on a carrier that is used for uplink transmission may be understood as an uplink resource or an uplink carrier, and a time domain resource on the carrier that is used for downlink transmission may be understood as a downlink resource or a downlink carrier.

Operating bandwidth: A BP activated (active) by a terminal. The operating bandwidth includes uplink operating bandwidth and downlink operating bandwidth. The uplink operating bandwidth is an uplink BP activated by the terminal, and the downlink operating bandwidth is a downlink BP activated by the terminal. A description is provided herein, and details are not described in the following again.

Subband or BP: A segment of frequency domain resource on a carrier.

UL BP: An uplink BP that can be used for transmission of a PUSCH, a PUCCH, an SRS, or the like, where the BP has attributes such as a bandwidth size, a bandwidth location, and a subcarrier spacing of bandwidth.

SRS BP: An uplink BP that can be used for transmission of only an SRS and/or a PRACH, where the BP has attributes such as a bandwidth size, a bandwidth location, and a subcarrier spacing of bandwidth.

RF retuning: In the embodiments of this application, RF retuning occurs between two BPs that are not in a coverage area of a same RF. If two BPs between which RF retuning occurs are in a coverage area of a same RF, no RF retuning occurs. In the embodiments of this application, that the two BPs are in the coverage area of the same RF means that all frequency domain resources of the two BPs are in the coverage area of the same RF. That the two BPs are not in the coverage area of the same RF means that all the frequency domain resources of the two BPs are not in the coverage area of the same RF. A description is provided herein, and details are not described in the following again.

For example, as shown in (1*a*) of FIG. 1, if a terminal is switched from an active uplink BP to an SRS BP 1 or an SRS BP 2, no RF retuning occurs because the active uplink BP, the SRS BP 1, and the SRS BP 2 all are in a coverage area of an RF; or if a terminal is switched from an active uplink BP to an SRS BP 3, RF retuning occurs because the active uplink BP is in a coverage area of an RF, and the SRS BP 3 is out of the coverage area of the RF, that is, the two BPs are not in a coverage area of a same RF. As shown in (1*b*) of FIG. 1, after the RF retuning occurs, the RF covers the SRS BP 3, and the SRS may be sent on the SRS BP 3.

Figure 2:
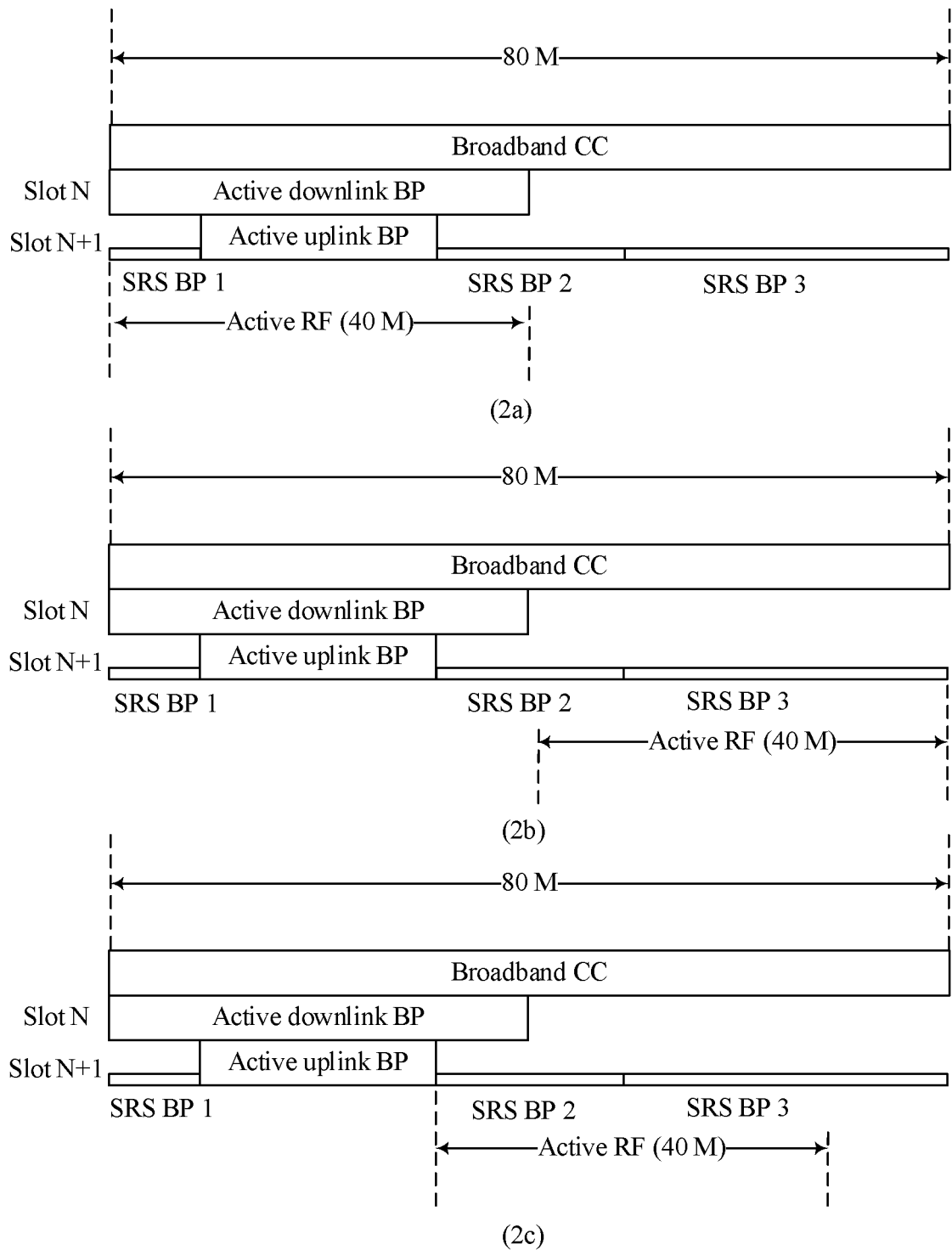
FIG. 2 is a schematic diagram 2 of a BP on a broadband CC according to an embodiment of this application.

Alternatively, as shown in (2*a*) of FIG. 2, if a terminal is switched from an active uplink BP to an SRS BP 1, no RF retuning occurs because both the active uplink BP and the SRS BP 1 are in a coverage area of an RF; or if a terminal is switched from an active uplink BP to an SRS BP 3, RF retuning occurs because the active uplink BP is in a coverage area of an RF, and the SRS BP 3 is out of the coverage area of the RF, that is, the two BPs are not in a coverage area of a same RF. As shown in (2*b*) of FIG. 2, after the RF retuning occurs, the RF covers the SRS BP 3, and the SRS may be sent on the SRS BP 3. If a terminal is switched from an active uplink BP to an SRS BP 2, because the active uplink BP is in a coverage area of an RF, one part of the SRS BP 2 is in the coverage area of the RF, and the other part of the SRS BP 2 is out of the coverage area of the RF, it is also considered that the two BPs are not in a coverage area of a same RF, and RF retuning occurs. As shown in (2*c*) of FIG. 2, after the RF retuning occurs, the RF covers the SRS BP 2, and the SRS may be sent on the SRS BP 2.

It should be noted that, in the example shown in FIG. 2, after the RF retuning occurs, a center of the RF is not aligned with a center of the SRS BP 2 or a center of the SRS BP 3. Certainly, RF retuning may alternatively be performed in a manner of aligning the center of the RF and a center of an SRS BP. This is not specifically limited in the embodiments of this application. The accompanying drawings are merely used to illustrate a scenario of RF retuning.

The following describes the technical solutions in the embodiments of this application with reference to the accompanying drawings in the embodiments of this application. In description of this application, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in description of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and the terms such as "first" and "second" do not mean being definitely different either.

Network architectures and service scenarios that are described in the embodiments of this application are intended to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are also applicable to a similar technical problem.

Figure 3:
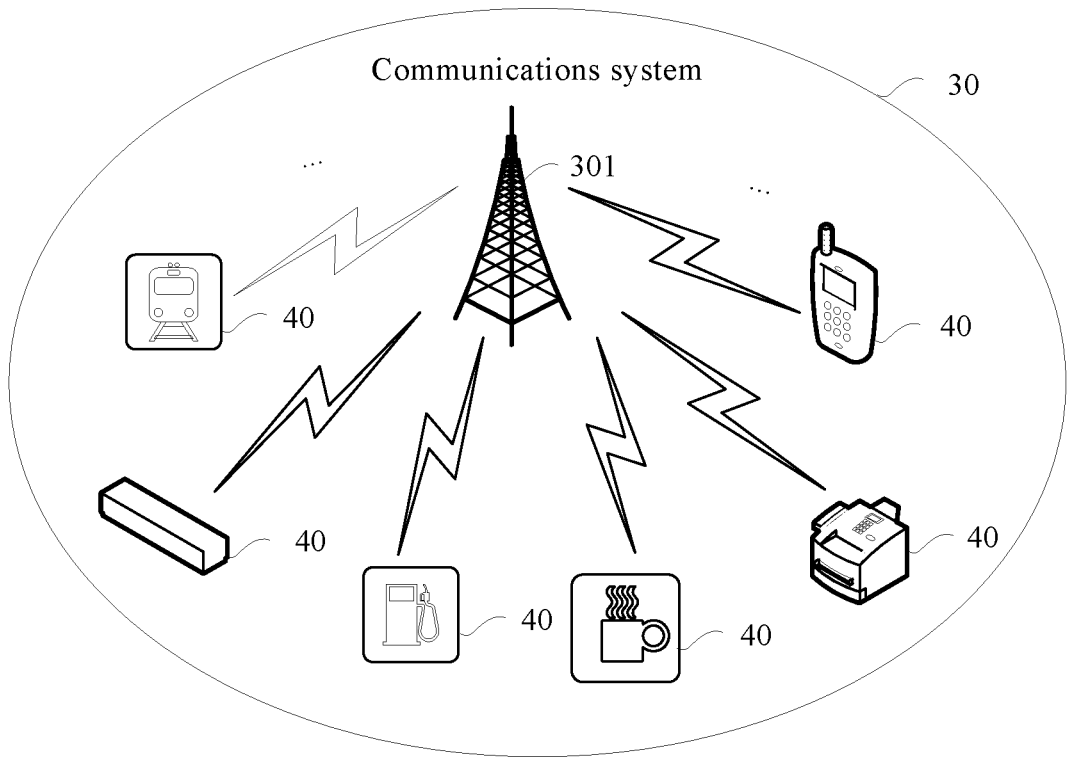
FIG. 3 is a schematic architectural diagram of an SRS transmission system according to an embodiment of this application.

FIG. 3 shows a communications system 30 according to an embodiment of this application. The communications system 30 includes an access device 301, and one or more communications apparatuses 40 connected to the access device 301.

The access device 301 is a device that accesses a core network, for example, may be a base station in an NR system or in a future evolved public land mobile network (PLMN), a broadband network gateway (BNG), an aggregation switch, or a non-3rd Generation Partnership Project (non-3GPP) access device. The base station may include various types of base stations, for example, a macro base station, a micro base station (also referred to as a small cell), a relay node, and an access point. This is not specifically limited in this embodiment of this application.

The communications apparatus 40 may be a terminal, a chip, or the like. This is not specifically limited in this embodiment of this application. The terminal may be a user equipment (UE), an access terminal, a terminal unit, a terminal station, a mobile station, a mobile console, a remote station, a remote terminal, a mobile device, a wireless communications device, a terminal agent, a terminal apparatus, or the like in the NR system or the future evolved PLMN. The access terminal may be a cellular phone, a cordless telephone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or the like. This is not specifically limited in this embodiment of this application.

Figure 4:
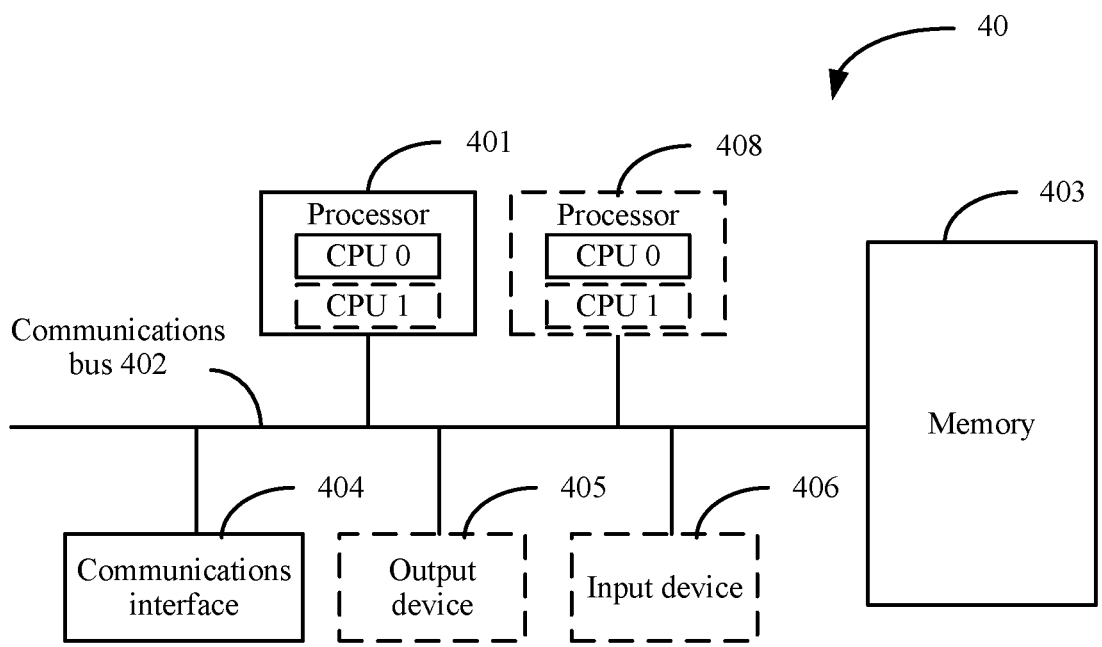
FIG. 4 is a schematic structural diagram of hardware of an SRS transmission apparatus according to an embodiment of this application.

FIG. 4 is a schematic structural diagram of hardware of a communications apparatus 40 according to an embodiment of this application. The communications apparatus 40 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits for controlling program execution of the solutions of this application.

The communications bus 402 may include a channel used for transmitting information between the foregoing components.

The communications interface 404 is any apparatus such as a transceiver, and is configured to communicate with another device or a communications network such as Ethernet, a radio access network (RAN), or a wireless local area network (WLAN).

The memory 403 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may be alternatively integrated with the processor.

The memory 403 is configured to store application program code for executing the solutions in this application, and the processor 401 controls the execution. The processor 401 is configured to execute the application program code stored in the memory 403, to implement an SRS transmission method provided in the following embodiment of this application.

Alternatively, optionally, in this embodiment of this application, the processor 401 may perform related processing functions in the SRS transmission method provided in the following embodiment of this application. The communications interface 404 is responsible for communicating with another device or a communications network. This is not specifically limited in this embodiment of this application.

In specific implementation, in an embodiment, the processor 401 may include one or more CPUs such as a CPU 0 and a CPU 1 in FIG. 4.

In a specific implementation, in an embodiment, the communications apparatus 40 may include a plurality of processors, for example, the processor 401 and a processor 408 in FIG. 4. Each of the processors may be a single-core (single-CPU) processor, or may be a multi-core (multi-CPU) processor. The processor herein may be one or more devices, circuits, and/or processing cores configured to process data (such as a computer program instruction).

In specific implementation, in an embodiment, the communications apparatus 40 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401, and may receive user input in a plurality of manners. For example, the input device 406 may be a mouse, a keyboard, a touchscreen device, or a sensing device.

In addition, as described above, the communications apparatus 40 provided in this embodiment of this application may be a chip, a terminal, or a device having a similar structure to that in FIG. 4. A type of the communications apparatus 40 is not limited in this embodiment of this application.

The following describes in detail, by using an example in which the communications apparatus is a terminal in the NR system and the access device is a base station in the NR system, the SRS transmission method provided in the embodiment of this application.

Figure 5:
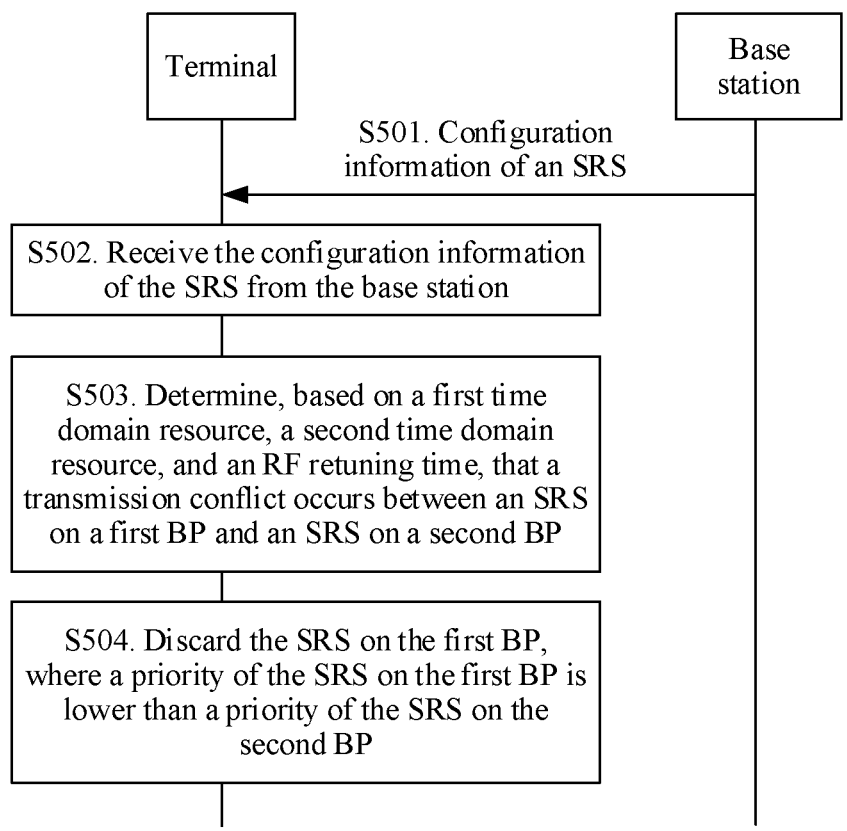
FIG. 5 is a schematic flowchart of an SRS transmission method according to an embodiment of this application.

FIG. 5 is a schematic flowchart of an SRS transmission method according to an embodiment of this application. In the SRS transmission method, if a terminal determines that a transmission conflict occurs between an SRS on a first BP and an SRS on a second BP, the terminal discards an SRS on a BP having an SRS with a lower priority, so that SRS BP-based switching can be implemented. Specifically, the SRS transmission method includes the following steps.

S501. A base station sends configuration information of an SRS to the terminal.

In this embodiment of this application, the configuration information of the SRS includes configuration information of the SRS on the first BP and configuration information of the SRS on the second BP. The configuration information of the SRS on the first BP includes a first time domain resource used for transmission of the SRS on the first BP, and the configuration information of the SRS on the second BP includes a second time domain resource used for transmission of the SRS on the second BP.

Specifically, the first time domain resource in this embodiment of this application is used to transmit the SRS on the first BP, and the second time domain resource is used to transmit the SRS on the second BP. The time domain resource herein includes information such as a quantity of OFDM symbols in a slot and locations of the OFDM symbols in a slot that are used to transmit an SRS. A description is provided herein, and details are not described in the following again.

Optionally, in this embodiment of this application, the base station may add the configuration information of the SRS to RRC signaling, and send the RRC signaling to the terminal. This is not specifically limited in this embodiment of this application.

Optionally, the first BP and the second BP in this embodiment of this application may be determined based on at least one of an uplink BP activated by the terminal and an RF of the terminal. This is not specifically limited in this embodiment of this application.

Optionally, the first BP and the second BP in this embodiment of this application may be BPs on a same CC carrier in a CA scenario, or may be BPs on one carrier in a non-CA scenario. For example, as shown in FIG. 1 or FIG. 2, the first BP may be the SRS BP 1, and the second BP may be the SRS BP 2. Alternatively, the first BP may be the SRS BP 2, and the second BP may be the SRS BP 3. Alternatively, the first BP may be the SRS BP 1, and the second BP may be the SRS BP 3.

Certainly, the first BP and the second BP in this embodiment of this application may alternatively be BPs on different CC carriers in a CA scenario. This is not specifically limited in this embodiment of this application.

Optionally, the CC carrier in this embodiment of this application may be a broadband CC carrier, or may be a non-broadband CC carrier. This is not specifically limited in this embodiment of this application.

It should be noted that, for ease of description, an example in which the first BP and the second BP are BPs on a same broadband CC carrier in the CA scenario is used for description in the following embodiments. A description is provided herein, and details are not described in the following again.

Optionally, the first BP in this embodiment of this application may be a BP on a TDD carrier, or may be a BP on an FDD carrier. The second BP may be a BP on a TDD carrier, or may be a BP on an FDD carrier. This is not specifically limited in this embodiment of this application.

Optionally, both the first BP and the second BP in this embodiment of this application may be SRS BPs of the terminal. For example, as shown in FIG. 1 or FIG. 2, the first BP may be the SRS BP 1, and the second BP may be the SRS BP 2. Alternatively, the first BP may be the SRS BP 2, and the second BP may be the SRS BP 3. Alternatively, the first BP may be the SRS BP 1, and the second BP may be the SRS BP 3.

Certainly, for the first BP and the second BP in this embodiment of this application, one BP may be the uplink BP activated by the terminal, and the other BP may be the SRS BP of the terminal. For example, as shown in FIG. 1 or FIG. 2, one BP may be the active uplink BP, and the other BP may be the SRS BP 1, the SRS BP 2, or the SRS BP 3.

S502. The terminal receives the configuration information of the SRS from the base station.

S503. The terminal determines, based on a first time domain resource, a second time domain resource, and an RF retuning time, that a transmission conflict occurs between the SRS on the first BP and the SRS on the second BP.

Figure 6A:
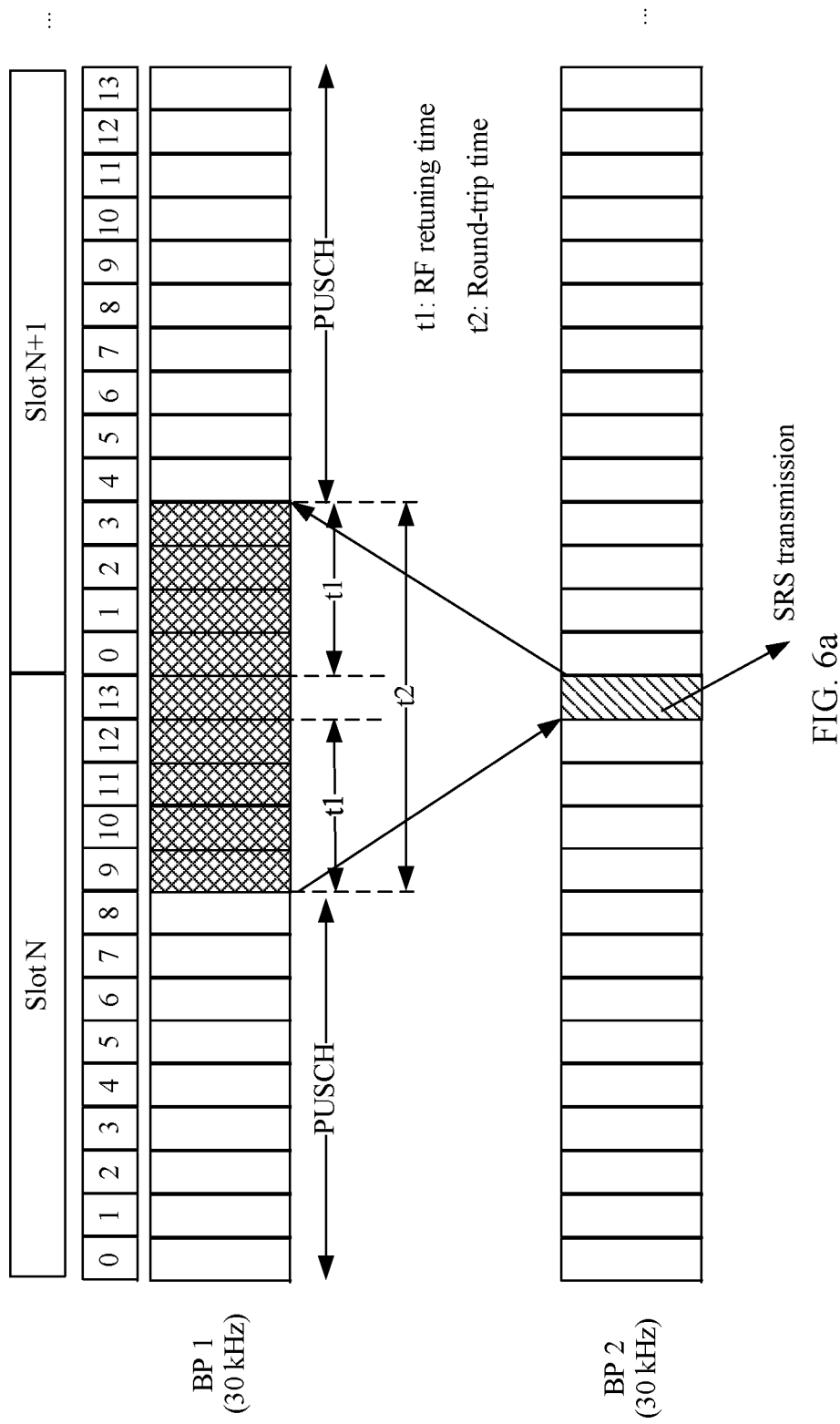
FIG. 6a and FIG. 6b are schematic diagrams of SRS BP-based switching according to an embodiment of this application.

Optionally, the RF retuning time in this embodiment of this application is a time required for switching the terminal from one BP to another BP when RF retuning occurs. For example, as shown in FIG. 6*a*, if it is assumed that RF retuning occurs when the terminal is switched from a BP 1 whose subcarrier spacing is 30 kHz to a BP 2 whose subcarrier spacing is 30 kHz, RF retuning time=t1, to be specific, a time corresponding to OFDM symbols 9, 10, 11, and 12 in a slot N. If it is assumed that the SRS is transmitted on an OFDM symbol 13 in the slot N, a round-trip time of RF retuning=2×t1+a transmission time of the SRS, to be specific, a sum of a time corresponding to the OFDM symbols 9, 10, 11, 12, and 13 in the slot N and a time corresponding to OFDM symbols 0, 1, 2, and 3 in a slot N+1.

Optionally, the RF retuning time in this embodiment of this application is related to an RF capability of the terminal. Generally, if the RF capability of the terminal is stronger, the RF retuning time is shorter. In addition, the RF retuning time may be configured on the terminal or may be determined by the terminal based on the RF capability of the terminal. For details, refer to an existing implementation. This is not specifically limited in this embodiment of this application.

Optionally, in this embodiment of this application, the terminal may alternatively report the RF retuning time to the base station, so that the base station can deliver a corresponding time domain resource based on the RF retuning time. For details, refer to description about the RF retuning time in a UE capability in the protocol 3GPP TS 36.331. Details are not described herein again.

Optionally, in this embodiment of this application, that a transmission conflict occurs between the SRS on the first BP and the SRS on the second BP includes the following two scenarios.

Scenario 1: The first BP is the uplink BP activated by the terminal, and the second BP is the SRS BP of the terminal, to be specific, there is a BP pair, and the BP pair includes the first BP and the second BP.

In this case, step S503 may specifically include the following: The terminal determines, based on the first time domain resource, the second time domain resource, and a third RF retuning time, that a time domain resource required when the terminal is switched from the first BP to the second BP includes the second time domain resource, where the third RF retuning time is a time required when the terminal is switched from the first BP to the second BP.

For example, as shown in FIG. 6*a*, it is assumed that the first BP is the BP 1 whose subcarrier spacing is 30 kHz, the second BP is the BP 2 whose subcarrier spacing is 30 kHz, the first time domain resource is the OFDM symbol 13 in the slot N. In other words, the SRS on the first BP is transmitted on the OFDM symbol 13 in the slot N, the second time domain resource is the OFDM symbol 13 in the slot N. In other words, the SRS on the second BP is transmitted on the OFDM symbol 13 in the slot N, and the third RF retuning time is four OFDM symbols. In this case, it may be learned, based on the first time domain resource, the second time domain resource, and the third RF retuning time, that the time domain resource required when the terminal is switched from the BP 1 to the BP 2 is the OFDM symbols 9, 10, 11, 12, and 13 in the slot N and the OFDM symbols 0, 1, 2, and 3 in the slot N+1, including the OFDM symbol 13 in the slot N. In other words, the time domain resource and the second time domain resource overlap. That is, if the SRS is transmitted on the BP 1, the SRS cannot be transmitted on the BP 2; or if the SRS is transmitted on the BP 2, the SRS cannot be transmitted on the BP 1. That is, a time domain resource required to transmit the SRS on the BP 1 conflicts with a time domain resource required to transmit the SRS on the BP 2.

Scenario 2: The first BP is the SRS BP, and the second BP is the SRS BP. In other words, there are two BP pairs, where one BP pair includes the uplink BP activated by the terminal and the first BP, and the other BP pair includes the uplink BP activated by the terminal and the second BP.

In this case, step S503 may specifically include the following: The terminal determines, based on the first time domain resource, the second time domain resource, a first RF retuning time, and a second RF retuning time, that a time domain resource required when the terminal is switched from an uplink BP activated by the terminal to the first BP and a time domain resource required when the terminal is switched from the uplink BP activated by the terminal to the second BP overlap, where the first RF retuning time is a time required when the terminal is switched from the uplink BP activated by the terminal to the first BP, and the second RF retuning time is a time required when the terminal is switched from the uplink BP activated by the terminal to the second BP.

Figure 6B:
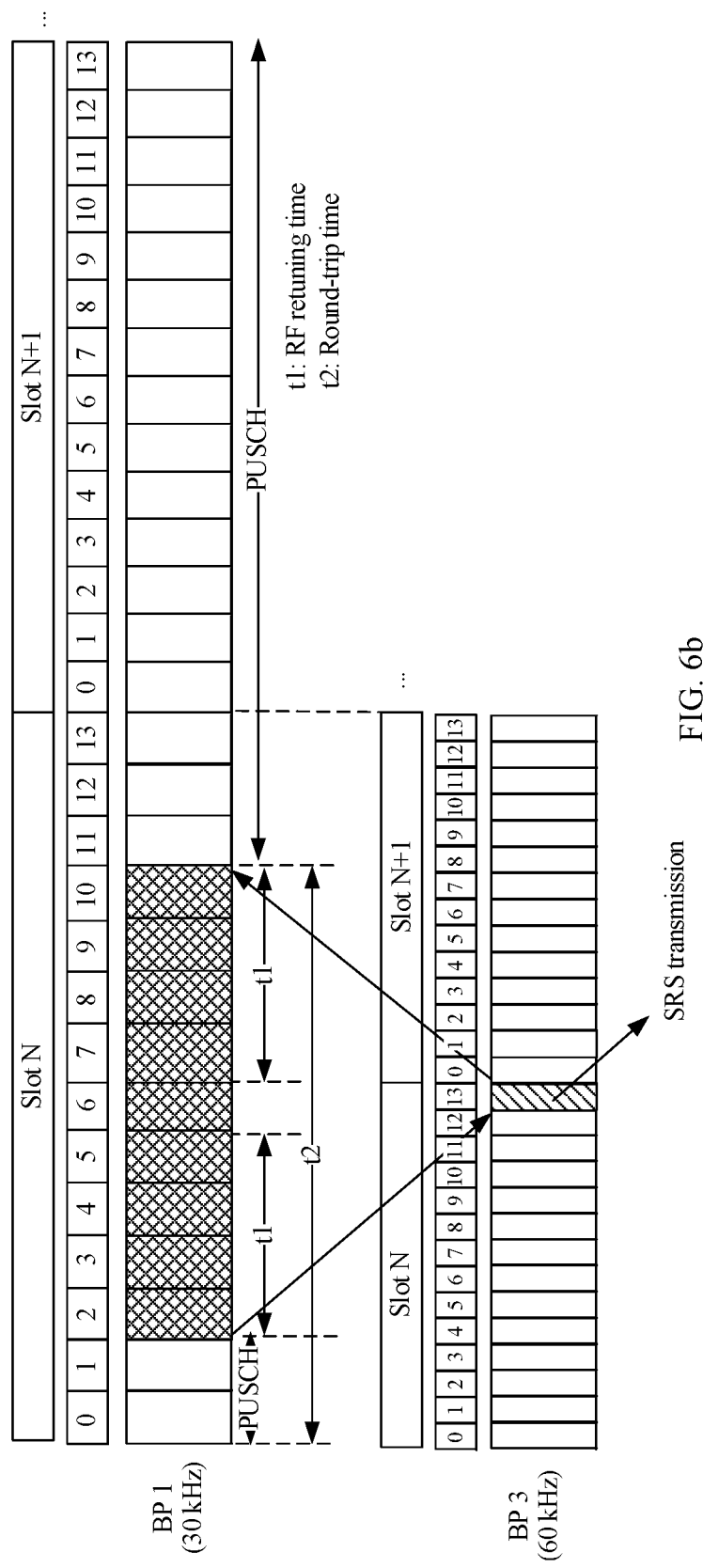

For example, as shown in FIG. 6a and FIG. 6b, it is assumed that the uplink BP activated by the terminal is the BP 1 whose subcarrier spacing is 30 kHz, the first BP is the BP 2 whose subcarrier spacing is 30 kHz, the second BP is the BP 3 whose subcarrier spacing is 60 kHz, the first time domain resource corresponding to the first BP is the OFDM symbol 13 in the slot N. In other words, the SRS on the first BP is transmitted on the OFDM symbol 13 in the slot N, the second time domain resource corresponding to the second BP is the OFDM symbol 13 in the slot N. In other words, the SRS on the second BP is transmitted on the OFDM symbol 13 in the slot N, and the first RF retuning time and the second RF retuning time each are four OFDM symbols. In this case, it may be learned, based on the first time domain resource and the first RF retuning time, that the time domain resource required when the terminal is switched from the BP 1 to the BP 2 is the OFDM symbols 9, 10, 11, 12, and 13 in the slot N and the OFDM symbols 0, 1, 2, and 3 in the slot N+1; and it may be learned, based on the second RF retuning time, that the time domain resource required when the terminal is switched from the BP 1 to the BP 3 is OFDM symbols 2 to 10 in the slot N. In this case, the time domain resource required when the terminal is switched from the BP 1 to the BP 2 and the time domain resource required when the terminal is switched from the BP 1 to the BP 3 overlap, and the overlapped part is the OFDM symbols 9 and 10 in the slot N. Therefore, if the terminal is switched from the BP 1 to the BP 2, the terminal cannot be switched from the BP 1 to the BP 3. If the terminal is switched from the BP 1 to the BP 3, the terminal cannot be switched from the BP 1 to the BP 2. In other words, if the SRS is transmitted on the BP 2, the SRS cannot be transmitted on the BP 3; or if the SRS is transmitted on the BP 3, the SRS cannot be transmitted on the BP 2. That is, a time domain resource required to transmit the SRS on the BP 2 conflicts with a time domain resource required to transmit the SRS on the BP 3.

It should be noted that steps S501 to S503 are merely an example of a specific implementation of determining that a transmission conflict occurs between the SRS on the first BP and the SRS on the second BP. Certainly, there may alternatively be another manner of determining that a transmission conflict occurs between the SRS on the first BP and the SRS on the second BP. In this embodiment of this application, to resolve a problem of SRS transmission after a conflict occurs between SRSs on BPs, the solution in this embodiment of this application may be used provided that it is determined that a transmission conflict occurs between the SRS on the first BP and the SRS on the second BP. Therefore, this embodiment of this application sets no specific limitation on how to determine that a transmission conflict occurs between SRSs on two BPs.

S504. The terminal discards the SRS on the first BP.

A priority of the SRS on the first BP is lower than a priority of the SRS on the second BP. In other words, the terminal discards an SRS on a BP having an SRS with a lower priority.

Optionally, in this embodiment of this application, when a transmission conflict occurs between the SRS on the first BP and the SRS on the second BP:

if the first BP is the uplink BP activated by the terminal, and the second BP is the SRS BP, that the terminal discards the SRS on the first BP specifically means that the terminal may be switched from the first BP to the second BP, to transmit the SRS on the second BP; or if both the first BP and the second BP are the SRS BPs, that the terminal discards the SRS on the first BP specifically means that the terminal may be switched from the uplink BP activated by the terminal to the second BP, to transmit the SRS on the second BP.

Optionally, in this embodiment of this application, that a priority of the SRS on the first BP is lower than a priority of the SRS on the second BP may be determined in the following manners.

Manner 1: Priorities of SRSs on different BPs are determined by using transmission cycles of the SRSs. Specifically, that a priority of the SRS on the first BP is lower than a priority of the SRS on the second BP includes the following: A transmission cycle of the SRS on the first BP is shorter than a transmission cycle of the SRS on the second BP, both the SRS on the first BP and the SRS on the second BP are periodic SRSs, or both the SRS on the first BP and the SRS on the second BP are semi-persistent scheduling SRSs. To be specific, for a same type of SRSs, in consideration that an SRS with a relatively short transmission cycle has a higher appearance probability than an SRS with a relatively long transmission cycle, the SRS with a relatively short transmission cycle may be discarded when a transmission conflict occurs between the SRS with a relatively short transmission cycle and the SRS with a relatively long transmission cycle, and the SRS is retransmitted in a next transmission cycle. For related description of the periodic SRS and the semi-persistent scheduling SRS, refer to the beginning part in DESCRIPTION OF EMBODIMENTS. Details are not described herein again.

For example, it is assumed that the first BP is the SRS BP 1 in (2a) of FIG. 2, and the second BP is the SRS BP 3 in (2a) of FIG. 2. The SRS BP 1 is a periodic SRS, and a transmission cycle is T1; and the SRS BP 3 is a periodic SRS, and a transmission cycle is T2, where T1<T2. Because a priority of an SRS with a relatively short transmission cycle is lower than a priority of an SRS with a relatively long transmission cycle, the terminal discards the SRS on the SRS BP 1 when a transmission conflict occurs between the SRS on the SRS BP 1 and the SRS on the SRS BP 3. For example, the terminal may be switched from the uplink BP activated by the terminal to the SRS BP 3, to transmit the SRS on the SRS BP 3.

Manner 2: Priorities of SRSs on different BPs are determined by using locations of the different BPs relative to the RF of the terminal. Specifically, that a priority of the SRS on the first BP is lower than a priority of the SRS on the second BP includes the following: The first BP is an SRS BP in the RF of the terminal, and the second BP is an SRS BP out of the RF of the terminal. To be specific, in consideration that the uplink BP activated by the terminal is in the RF of the terminal, RF retuning does not need to be performed when the terminal is switched from the active uplink BP to the first BP, and RF retuning needs to be performed when the terminal is switched from the active uplink BP to the second BP. However, generally, on an SRS BP on which RF retuning does not need to be performed, a configuration density of the SRS is relatively high; and on an SRS BP on which RF retuning needs to be performed, a configuration density of the SRS is relatively low. Therefore, to obtain a channel status of entire carrier bandwidth as soon as possible, the SRS BP in the RF of the terminal may be discarded when a transmission conflict occurs between the SRS on the SRS BP out of the RF of the terminal and the SRS on the SRS BP in the RF of the terminal.

For example, it is assumed that the first BP is the SRS BP 1 in (2*a*) of FIG. 2, and the second BP is the SRS BP 2 in (2*a*) of FIG. 2. Therefore, because the SRS BP 1 is in the RF of the terminal, and the SRS BP 2 is out of the RF of the terminal, the terminal discards the SRS on the SRS BP 1 when a transmission conflict occurs between the SRS on the SRS BP 1 and the SRS on the SRS BP 2. For example, the terminal may be switched from the uplink BP activated by the terminal to the SRS BP 2, to transmit the SRS on the SRS BP 2.

Manner 3: Priorities of SRSs on different BPs are determined by using types of the BPs. Specifically, that a priority of the SRS on the first BP is lower than a priority of the SRS on the second BP includes the following: The first BP is the uplink BP activated by the terminal, and the second BP is the SRS BP of the terminal. To be specific, in consideration that a configuration density of the SRS on the uplink BP activated by the terminal is higher than a configuration density of the SRS on the SRS BP of the terminal, to obtain a channel status of entire carrier bandwidth as soon as possible, the SRS on the uplink BP activated by the terminal may be discarded when a transmission conflict occurs between the SRS on the uplink BP activated by the terminal and the SRS on the SRS BP of the terminal.

For example, it is assumed that the first BP is the active uplink BP in (2*a*) of FIG. 2, and the second BP is the SRS BP 2 in (2*a*) of FIG. 2. Therefore, because a priority of the active uplink BP is lower than a priority of the SRS BP, the terminal discards the SRS on the active uplink BP when a transmission conflict occurs between the SRS on the active uplink BP and the SRS on the SRS BP 2. For example, the terminal may be switched from the uplink BP activated by the terminal to the SRS BP 2, to transmit the SRS on the SRS BP 2.

Manner 4: Priorities of SRSs on different BPs are determined by using transmission cycles of the SRSs and locations of the BPs relative to the RF of the terminal. Specifically, that a priority of the SRS on the first BP is lower than a priority of the SRS on the second BP includes the following: Both the first BP and the second BP are SRS BPs in the RF of the terminal or SRS BPs out of the RF of the terminal, a transmission cycle of the SRS on the first BP is shorter than a transmission cycle of the SRS on the second BP, and both the SRS on the first BP and the SRS on the second BP are periodic SRSs, or both the SRS on the first BP and the SRS on the second BP are semi-persistent scheduling SRSs. To be specific, for a same type of SRSs on BPs whose locations relative to the RF of the terminal are the same, in consideration that an SRS with a relatively short transmission cycle has a higher appearance probability than an SRS with a relatively long transmission cycle, the SRS with a relatively short transmission cycle may be discarded when a transmission conflict occurs between the SRS with a relatively short transmission cycle and the SRS with a relatively long transmission cycle, and the SRS is retransmitted in a next transmission cycle. For related description of the periodic SRS and the semi-persistent scheduling SRS, refer to the beginning part in DESCRIPTION OF EMBODIMENTS. Details are not described herein again.

A difference between manner 1 and manner 4 lies in that: In manner 1, the locations of the different BPs relative to the RF of the terminal are not considered, and only the transmission cycles of the SRSs are considered; but in manner 4, both the first BP and the second BP are the SRS BPs in the RF of the terminal, or both the first BP and the second BP are the SRS BPs out of the RF of the terminal.

For example, it is assumed that the first BP is the SRS BP 1 in (1*a*) of FIG. 1, and the second BP is the SRS BP 2 in (1*a*) of FIG. 1. The SRS BP 1 is a semi-persistent scheduling SRS, and a transmission cycle is T3; and the SRS BP 2 is a semi-persistent scheduling SRS, and a transmission cycle is T4, where T3<T4. Because a priority of an SRS with a relatively short transmission cycle is lower than a priority of an SRS with a relatively long transmission cycle, the terminal discards the SRS on the SRS BP 1 when a transmission conflict occurs between the SRS on the SRS BP 1 and the SRS on the SRS BP 2. For example, the terminal may be switched from the uplink BP activated by the terminal to the SRS BP 2, to transmit the SRS on the SRS BP 2.

Alternatively, for example, it is assumed that the first BP is the SRS BP 2 in (2*a*) of FIG. 2, and the second BP is the SRS BP 3 in (2*a*) of FIG. 2. The SRS BP 2 is a periodic SRS, and a transmission cycle is T5; and the SRS BP 3 is a periodic SRS, and a transmission cycle is T2, where T5<T2. Because a priority of an SRS with a relatively short transmission cycle is lower than a priority of an SRS with a relatively long transmission cycle, the terminal discards the SRS on the SRS BP 2 when a transmission conflict occurs between the SRS on the SRS BP 2 and the SRS on the SRS BP 3. For example, the terminal may be switched from the uplink BP activated by the terminal to the SRS BP 3, to transmit the SRS on the SRS BP 3.

Manner 5: Priorities of SRSs on different BPs are determined by using types of the SRSs and locations of the BPs relative to the RF of the terminal. Specifically, that a priority of the SRS on the first BP is lower than a priority of the SRS on the second BP includes the following: Both the first BP and the second BP are SRS BPs in the RF of the terminal or SRS BPs out of the RF of the terminal, the SRS on the first BP is a periodic SRS, and the SRS on the second BP is a semi-persistent scheduling SRS; or the SRS on the first BP is a periodic SRS, and the SRS on the second BP is an aperiodic SRS; or the SRS on the first BP is a semi-persistent scheduling SRS, and the SRS on the second BP is an aperiodic SRS. To be specific, for different types of SRSs, in consideration that the aperiodic SRS appears irregularly, the semi-persistent scheduling SRS appears regularly but depends on whether DCI triggers or terminates sending of the SRS, and the periodic SRS appears regularly without depending on an external condition, the periodic SRS may be discarded when a transmission conflict occurs between the periodic SRS and the semi-persistent scheduling SRS, and the SRS is retransmitted next time; and the semi-persistent scheduling SRS may be discarded when a transmission conflict occurs between the aperiodic SRS and the semi-persistent scheduling SRS, and the SRS is retransmitted next time. That is, a priority of the aperiodic SRS>a priority of the semi-persistent scheduling SRS>a priority of the periodic SRS. For related description of the periodic SRS, the aperiodic SRS, and the semi-persistent scheduling SRS, refer to the beginning part in DESCRIPTION OF EMBODIMENTS. Details are not described herein again.

For example, it is assumed that the first BP is the SRS BP 1 in (1*a*) of FIG. 1, and the second BP is the SRS BP 2 in (1*a*) of FIG. 1. The SRS BP 1 is a semi-persistent scheduling SRS, and the SRS BP 2 is an aperiodic SRS. Because a priority of the semi-persistent scheduling SRS is lower than a priority of the aperiodic SRS, the terminal discards the SRS on the SRS BP 1 when a transmission conflict occurs between the SRS on the SRS BP 1 and the SRS on the SRS BP 2. For example, the terminal may be switched from the uplink BP activated by the terminal to the SRS BP 2, to transmit the SRS on the SRS BP 2.

Alternatively, for example, it is assumed that the first BP is the SRS BP 2 in (2*a*) of FIG. 2, and the second BP is the SRS BP 3 in (2*a*) of FIG. 2. The SRS BP 2 is a periodic SRS, and the SRS BP 3 is an aperiodic SRS. Because a priority of the periodic SRS is lower than a priority of the aperiodic SRS, the terminal discards the SRS on the SRS BP 2 when a transmission conflict occurs between the SRS on the SRS BP 2 and the SRS on the SRS BP 3. For example, the terminal may be switched from the uplink BP activated by the terminal to the SRS BP 3, to transmit the SRS on the SRS BP 3.

Example 1 to example 5 provide several manners for determining that the priority of the SRS on the first BP is lower than the priority of the SRS on the second BP. In example 2, example 4, and example 5, the priority of the SRS on the first BP and the priority of the SRS on the second BP are related to the location of the RF of the terminal. Certainly, that a priority of the SRS on the first BP is lower than a priority of the SRS on the second BP may be alternatively determined in another manner. This is not specifically limited in this embodiment of this application.

It should be noted that in this embodiment of this application, when there are a plurality of BPs, SRSs on any two BPs may be transmitted by using the SRS transmission method provided in this embodiment of this application. For example, for the active uplink BP, the SRS BP 1, the SRS BP 2, and the SRS BP 3 in (1*a*) of FIG. 1, if the SRS on the SRS BP 1 is a periodic SRS, and the SRS on the SRS BP 2 is an aperiodic SRS, a priority of an SRS on each BP may be determined in the foregoing manner, so as to determine an SRS that can be finally transmitted. For example, if a transmission conflict occurs between the SRS on the SRS BP 1 and the SRS on the active uplink BP, it may be determined, in manner 3, that the priority of the SRS on the active uplink BP is lower than the priority of the SRS on the SRS BP 1, and the SRS on the active uplink BP is discarded. If a transmission conflict occurs between the SRS on the SRS BP 1 and the SRS on the SRS BP 2, it may be determined, in manner 5, that the priority of the SRS on the SRS BP 1 is lower than the priority of the SRS on the SRS BP 2, and the SRS on the SRS BP 1 is discarded. If a transmission conflict occurs between the SRS on the SRS BP 2 and the SRS on the SRS BP 3, it may be determined, in manner 2, that the priority of the SRS on the SRS BP 2 is lower than the priority of the SRS on the SRS BP 3, and the SRS on the SRS BP 2 is discarded. In this case, if there is no transmission conflict occurring between an SRS on another BP and the SRS on the SRS BP 3, the terminal may be switched from the uplink BP activated by the terminal to the SRS BP 3, to transmit the SRS on the SRS BP 3, so as to obtain a channel measurement result of the SRS BP 3.

According to the SRS transmission method provided in this embodiment of this application, an SRS with a lower priority may be discarded when a transmission conflict occurs between SRSs on two BPs. To be specific, the terminal may be switched from the active uplink BP to a BP on which an SRS with a higher priority is transmitted, to transmit an SRS on the BP on which the SRS with a higher priority is transmitted. Therefore, SRS BP-based switching can be implemented.

The actions of the terminal in steps S501 to S504 may be performed by the processor 401 in the communications apparatus 40 in FIG. 4 by invoking the application program code stored in the memory 402. This is not limited in this embodiment of this application.

The solutions provided in the embodiments of this application are mainly described above from a perspective of interaction between network elements. It may be understood that, the communications apparatus includes a corresponding hardware structure and/or software module for performing each function to implement the foregoing functions. A person of ordinary skill in the art should easily be aware that, in combination with the examples described in the embodiments disclosed in this application, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function modules based on the foregoing method examples. For example, each function module may be obtained through division based on each function, or two or more functions may be integrated into one processing module. The integrated module may be implemented in a form of hardware, or may be implemented in a form of a software function module. It should be noted that, in this embodiment of this application, module division is an example, and is merely a logical function division. In actual implementation, another division manner may be used.

Figure 7:
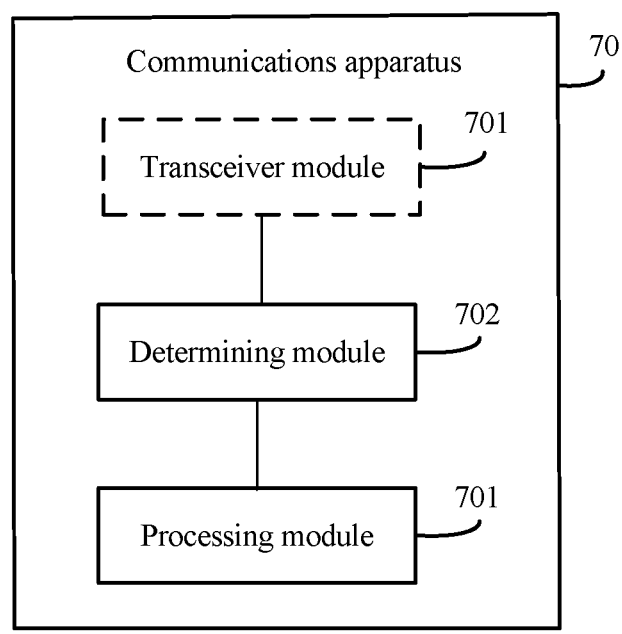
FIG. 7 is a schematic structural diagram of an SRS transmission apparatus according to an embodiment of this application.

For example, when each function module is obtained through integration, FIG. 7 is a possible schematic structural diagram of a communications apparatus 70 in the foregoing embodiment. The communications apparatus 70 includes a determining module 702 and a processing module 701. The determining module 702 is configured to determine that a transmission conflict occurs between an SRS on a first BP and an SRS on a second BP. The processing module 701 is configured to discard the SRS on the first BP, where a priority of the SRS on the first BP is lower than a priority of the SRS on the second BP.

Optionally, as shown in FIG. 7, the communications apparatus 70 may further include a transceiver module 703. The transceiver module 703 is configured to receive configuration information of an SRS, where the configuration information of the SRS includes configuration information of the SRS on the first BP and configuration information of the SRS on the second BP, the configuration information of the SRS on the first BP includes a first time domain resource used for transmission of the SRS on the first BP, and the configuration information of the SRS on the second BP includes a second time domain resource used for transmission of the SRS on the second BP. The determining module 702 is specifically configured to determine, based on the first time domain resource, the second time domain resource, and an RF retuning time, that a transmission conflict occurs between the SRS on the first BP and the SRS on the second BP.

In a possible implementation, the determining module 702 is specifically configured to determine, based on the first time domain resource, the second time domain resource, a first RF retuning time, and a second RF retuning time, that a time domain resource required when a terminal is switched from an uplink BP activated by the terminal to the first BP and a time domain resource required when the terminal is switched from the uplink BP activated by the terminal to the second BP overlap, where the first RF retuning time is a time required when the terminal is switched from the uplink BP activated by the terminal to the first BP, the second RF retuning time is a time required when the terminal is switched from the uplink BP activated by the terminal to the second BP, and both the first BP and the second BP are SRS BPs of the terminal.

In a possible implementation, the determining module 702 is specifically configured to determine, based on the first time domain resource, the second time domain resource, and a third RF retuning time, that a time domain resource required when a terminal is switched from the first BP to the second BP includes the second time domain resource, where the third RF retuning time is a time required when the terminal is switched from the first BP to the second BP, the first BP is an uplink BP activated by the terminal, and the second BP is an SRS BP of the terminal.

All content related to each step in the foregoing method embodiments may be cited in function description of a corresponding function module. Details are not described herein again.

In this embodiment, the communications apparatus 70 is presented in a form of function modules obtained through integration. The "module" herein may be an application-specific integrated circuit (ASIC), a circuit, a processor and a memory that execute one or more software programs or firmware programs, an integrated logic circuit, and/or another component that can provide the foregoing function. In a simple embodiment, a person skilled in the art can figure out that the communications apparatus 70 may use the form shown in FIG. 4. For example, functions/implementation processes of the processing module 701, the determining module 702, and the transceiver module 703 in FIG. 7 may be implemented by using the processor 401 and the memory 403 in FIG. 4. Specifically, the processing module 701 may be implemented by the processor 401 by invoking the application program code stored in the memory 403. This is not limited in this embodiment of this application. Alternatively, optionally, functions/implementation processes of the processing module 701 and the determining module 702 in FIG. 7 may be implemented by using the processor 401 in FIG. 4. The transceiver module 703 in FIG. 7 may be implemented by using the communications interface 404 in FIG. 4. This is not limited in this embodiment of this application.

Because the communications apparatus 70 provided in this embodiment of this application may be configured to perform the foregoing SRS transmission method, for a technical effect that can be obtained by the communications apparatus 70, refer to the foregoing method embodiment. Details are not described again herein.

In the foregoing embodiment, the communications apparatus 70 is presented in a form of function modules obtained through integration. Certainly, each function module of the communications apparatus may be obtained through division based on each function in this embodiment of this application. This is not specifically limited in this embodiment of this application.

Optionally, an embodiment of this application provides a chip system. The chip system includes a processor, where the processor is configured to support a communications apparatus in implementing the foregoing SRS transmission method, for example, determining that a transmission conflict occurs between an SRS on a first BP and an SRS on a second BP. In a possible design, the chip system further includes a memory. The memory is configured to store a program instruction and data required by the communications apparatus. The chip system may include a chip, or may include a chip and another discrete device. This is not specifically limited in this embodiment of this application.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "including" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for sounding reference signal (SRS) transmission, the method comprising:
   determining that a transmission conflict occurs between an SRS on a first bandwidth part (BP) and an SRS on a second BP; and
   discarding the SRS on the first BP, wherein a priority of the SRS on the first BP is lower than a priority of the SRS on the second BP.

2. The method according to claim 1,
wherein the first BP is an uplink BP activated by a terminal, and the second BP is an SRS BP of the terminal; or
wherein both the first BP and the second BP are SRS BPs of the terminal.

3. The method according to claim 1, wherein the priority of the SRS on the first BP and the priority of the SRS on the second BP are related to a location of a radio frequency (RF) of a terminal.

4. The method according to claim 1, wherein the first BP is an SRS BP in a radio frequency (RF) of a terminal, and the second BP is an SRS BP out of the RF of the terminal.

5. The method according to claim 1,
wherein both the first BP and the second BP are SRS BPs in a radio frequency (RF) of a terminal; and
wherein a transmission cycle of the SRS on the first BP is less than a transmission cycle of the SRS on the second BP; and
wherein both the SRS on the first BP and the SRS on the second BP are periodic SRSs, or both the SRS on the first BP and the SRS on the second BP are semi-persistent scheduling SRSs.

6. The method according to claim 1,
wherein both the first BP and the second BP are SRS BPs out of a radio frequency (RF) of a terminal;
wherein a transmission cycle of the SRS on the first BP is less than a transmission cycle of the SRS on the second BP; and
wherein both the SRS on the first BP and the SRS on the second BP are periodic SRSs, or both the SRS on the first BP and the SRS on the second BP are semi-persistent scheduling SRSs.

7. The method according to claim 1, wherein both the first BP and the second BP are SRS BPs in a radio frequency (RF) of a terminal, wherein:
the SRS on the first BP is a periodic SRS, and the SRS on the second BP is a semi-persistent scheduling SRS; or
the SRS on the first BP is a periodic SRS, and the SRS on the second BP is an aperiodic SRS; or
the SRS on the first BP is a semi-persistent scheduling SRS, and the SRS on the second BP is an aperiodic SRS.

8. The method according to claim 1, wherein both the first BP and the second BP are SRS BPs out of a radio frequency (RF) of a terminal, wherein:
the SRS on the first BP is a periodic SRS, and the SRS on the second BP is a semi-persistent scheduling SRS; or
the SRS on the first BP is a periodic SRS, and the SRS on the second BP is an aperiodic SRS; or
the SRS on the first BP is a semi-persistent scheduling SRS, and the SRS on the second BP is an aperiodic SRS.

9. The method according to claim 1, wherein:
a transmission cycle of the SRS on the first BP is less than a transmission cycle of the SRS on the second BP; and
both the SRS on the first BP and the SRS on the second BP are periodic SRSs, or both the SRS on the first BP and the SRS on the second BP are semi-persistent scheduling SRSs.

10. The method according to claim 1, wherein the first BP and the second BP are BPs in a same broadband component carrier.

11. The method according to claim 1, further comprising:
receiving configuration information of an SRS, wherein the configuration information of the SRS comprises configuration information of the SRS on the first BP and configuration information of the SRS on the second BP, wherein the configuration information of the SRS on the first BP comprises a first time domain resource used for transmission of the SRS on the first BP, and the configuration information of the SRS on the second BP comprises a second time domain resource used for transmission of the SRS on the second BP;
wherein determining that the transmission conflict occurs between the SRS on the first BP and the SRS on the second BP comprises:
determining, based on the first time domain resource, the second time domain resource, and a radio frequency (RF) retuning time, that the transmission conflict occurs between the SRS on the first BP and the SRS on the second BP.

12. The method according to claim 11, wherein the determining, based on the first time domain resource, the second time domain resource, and the RF retuning time, that the transmission conflict occurs between the SRS on the first BP and the SRS on the second BP comprises:
determining, based on the first time domain resource, the second time domain resource, a first RF retuning time, and a second RF retuning time, that a time domain resource required when a terminal is switched from an uplink BP activated by the terminal to the first BP and a time domain resource required when the terminal is switched from the uplink BP activated by the terminal to the second BP overlap, wherein the first RF retuning time is a time required when the terminal is switched from the uplink BP activated by the terminal to the first BP, the second RF retuning time is a time required when the terminal is switched from the uplink BP activated by the terminal to the second BP, and both the first BP and the second BP are SRS BPs of the terminal.

13. The method according to claim 11, wherein the determining, based on the first time domain resource, the second time domain resource, and the RF retuning time, that the transmission conflict occurs between the SRS on the first BP and the SRS on the second BP comprises:
determining, based on the first time domain resource, the second time domain resource, and a third RF retuning time, that a time domain resource required when a terminal is switched from the first BP to the second BP comprises the second time domain resource, wherein the third RF retuning time is a time required when the terminal is switched from the first BP to the second BP, the first BP is an uplink BP activated by the terminal, and the second BP is an SRS BP of the terminal.

14. A communications apparatus, comprising:
a processor configured to:
determine that a transmission conflict occurs between a sounding reference signal (SRS) on a first bandwidth part (BP) and an SRS on a second BP; and
discard the SRS on the first BP, wherein a priority of the SRS on the first BP is lower than a priority of the SRS on the second BP.

15. The communications apparatus according to claim 14, wherein the priority of the SRS on the first BP and the priority of the SRS on the second BP are related to a location of a radio frequency (RF) of a terminal.

16. The communications apparatus according to claim 14, further comprising:
a transceiver configured to receive configuration information of an SRS, wherein the configuration information of the SRS comprises configuration information of the SRS on the first BP and configuration information of the SRS on the second BP, wherein the configuration information of the SRS on the first BP comprises a first time domain resource used for transmission of the SRS on the first BP, and the configuration information of the SRS on the second BP comprises a second time domain resource used for transmission of the SRS on the second BP; and wherein the processor is further configured to determine, based on the first time domain resource, the second time domain resource, and a radio frequency (RF) retuning time, that the transmission conflict occurs between the SRS on the first BP and the SRS on the second BP.

17. The communications apparatus according to claim 16, wherein the processor is further configured to:

determine, based on the first time domain resource, the second time domain resource, a first RF retuning time, and a second RF retuning time, that a time domain resource required when a terminal is switched from an uplink BP activated by the terminal to the first BP and a time domain resource required when the terminal is switched from the uplink BP activated by the terminal to the second BP overlap, wherein the first RF retuning time is a time required when the terminal is switched from the uplink BP activated by the terminal to the first BP, the second RF retuning time is a time required when the terminal is switched from the uplink BP activated by the terminal to the second BP, and both the first BP and the second BP are SRS BPs of the terminal.

18. The communications apparatus according to claim 16, wherein the processor is further configured to:

determine, based on the first time domain resource, the second time domain resource, and a third RF retuning time, that a time domain resource required when a terminal is switched from the first BP to the second BP comprises the second time domain resource, wherein the third RF retuning time is a time required when the terminal is switched from the first BP to the second BP, the first BP is an uplink BP activated by the terminal, and the second BP is an SRS BP of the terminal.

19. A non-transitory computer-readable storage medium storing instructions that, when executed on a computer, cause the computer to perform a method for sounding reference signal (SRS) transmission, the method comprising:

determining that a transmission conflict occurs between an SRS on a first bandwidth part (BP) and an SRS on a second BP; and discarding the SRS on the first BP, wherein a priority of the SRS on the first BP is lower than a priority of the SRS on the second BP.

20. The computer-readable storage medium according to claim 19, wherein the priority of the SRS on the first BP and the priority of the SRS on the second BP are related to a location of a radio frequency (RF) of a terminal.

* * * * *